June 16, 1925.

K. VON KANDO

ALTERNATING CURRENT POWER TRANSMISSION PLANT

Filed Sept. 17, 1920

Inventor:
Kálmán von Kandó,
by Emery, Booth, Janney & Varney
Attys.

June 16, 1925.

K. VON KANDO

ALTERNATING CURRENT POWER TRANSMISSION PLANT

Filed Sept. 17, 1920  4 Sheets-Sheet 3

Inventor:
Kálmán von Kandó,

Patented June 16, 1925.

1,542,426

UNITED STATES PATENT OFFICE.

KALMAN VON KANDO, OF BUDAPEST, HUNGARY.

ALTERNATING-CURRENT POWER-TRANSMISSION PLANT.

Application filed September 17, 1920. Serial No. 411,018.

*To all whom it may concern:*

Be it known that I, KALMAN VON KANDO, a citizen of Hungary, residing at Budapest, in the Kingdom of Hungary, have invented certain new and useful Improvements in Alternating - Current Power - Transmission Plants, for which I have filed applications in Hungary dated August 30, 1916, December 1, 1916, August 16, 1918, and April 22, 1920; in Germany dated December 21, 1917, and May 5, 1920; in Austria dated February 21, 1920, and May 3, 1920; and in Italy dated February 25, 1920, of which the following is a specification.

My invention relates to alternating current power transmission plants with induction motors working with a load varying within a wide range for example in electric railway service and especially to means for improving the efficiency of such plants.

My invention comprises the improving of the efficiency of the induction motors by a suitable regulation of the voltage impressed to the motor as well as the improving of the efficiency of the current source, if, as will be the case especially in traction systems, the motors are fed by secondary generators transforming a high-voltage monophase current into a low-voltage polyphase current.

The improving of the efficiency of the motors is based on the fact, that the efficiency of alternating current induction motors increases at a given voltage of the feeding current with increasing load up to a maximum, when it drops with further increase of the load. This maximum value of efficiency will be found for every terminal voltage at a different load and is attained, as long as the active iron of the motor has not reached its saturation,—at a pressure directly proportional to the square root of the load, whereby the power-factor remains constant, as will be shown later on.

According to my invention I provide automatic means for regulating the pressure of the current source (which may be of primary, secondary or a higher order) directly or indirectly in response to a change in the load or the power factor substantially in direct proportion to the square root of the load or to a substantially constant power factor.

It is obvious that the maximum value of efficiency is attained at the minimum value of the losses.

The iron-losses of an induction motor are approximately proportional to the square of the pressure, whilst the friction losses are practically constant so that the total losses may be given by the equation:

$$(a) \quad Q = A + Be^2 + C_1 i_1^2 + C_2 i_2^2$$

in which A is the constant friction loss, $e$ the pressure; $i_1$ and $i_2$ are respectively the primary and secondary current strengths and B, $C_1$, $C_2$ are constants.

In this equation $(a)$ the iron losses are not given with theoretic precision, because the losses are not directly proportional to the square but to a somewhat smaller power (theoretically between 1.6 and 2, in most cases practically exceeding 1.8) of the pressure. A thorough investigation of the conditions shows however, that the sum of the friction and iron losses can be expressed by $A' + B'e^2$ with practically sufficient approximation in which $A'$ and $B'$ are constants dependent upon both the friction losses and iron losses.

Figure 1:
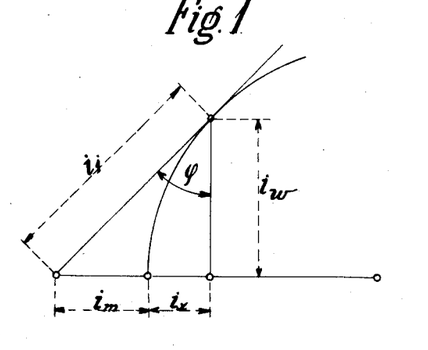
Fig. 1 is a diagram showing the relation between the primary current and its various components in an induction motor.

The primary current strength $i_1$ is a resultant of the watt-component $i_w$ (Fig. 1) and of the wattless component, which latter is again a resultant of the magnetizing current $i_m$ and of the dispersion-component $i_x$, hence $$(b) \quad i_1^2 = i_w^2 + (i_m + i_x)^2$$

The current-components may be represented with good approximation by the total watt-consumption W and by the pressure $e$ as follows:

$$(c) \quad i_w = \frac{W}{e} \quad i_m = Me$$

and $$i_x = X \frac{i_w^2}{e} = X \frac{W^2}{e^3}$$

M and X being constants.

$i_2$ may be similarly expressed if in equation $(b)$ $i_m$ is set to zero; hence $$i_2^2 = i_w^2 + i_x^2$$

If these values of $i_w$, $i_m$ and $i_x$ are set into equation $(a)$, after suitably rearranging the equation, we find for the total loss $$Q = A + (B + M^2 C_1)e^2 + (C_1 + C_2 + 2MXC_1)\frac{W}{e^2} + (C_1 + C_2)X^2 \frac{W^4}{e^6}$$

To find the value of the pressure corresponding to the minimum value of the loss $Q$, we have to set the differential $\frac{dQ}{de}$ equal to zero:

$$\frac{dQ}{de} = 2(B+M^2C_1)e - 2(C_1+C_2+2MXC_1)\frac{W^2}{e^3} - 6(C_1+C_2)X^2\frac{W^4}{e^7}$$

being only possible if $\frac{W}{e^2}$ or according to equation (c) $\frac{i_w}{e}$ has a definite constant value. Hence it follows, that at the minimum value of the losses, the pressure "$e$" is directly proportional to the square root of the load "W".

From the general current diagram of the induction motors (Fig. 1) it will be seen that (as long as the magnetizing current $i_m$ is directly proportional to the pressure $e$, viz. the active iron of the motor has not reached its saturation), the power factor $\cos\delta$ is a function of $\frac{i_w}{e}$, so that at a constant value of $\frac{i_w}{e}$ or according to equation (c) at a constant value of $\frac{W}{e_2}$ the power faction will remain constant.

It is obvious, that the losses in the current supply source and in the current lines are partly directly proportional to $e^2$, partly to $i_w^2$ and to $i_1^2$, so that the total losses of energy of the whole plant are represented by the formula $$P + Re^2 + S\frac{W^2}{e^2} + T\frac{W^4}{e^6}$$

P, R, S and T being constants. The condition for the highest efficiency of the whole plant at varying load will be equally $\frac{W}{e^2}$ = constant $\cos\delta$ = constant respectively, but these constants will have obviously other values, than former.

To find which is the value of the power-factor to be held constant, it must be determined at which value of the power-factor the motor works under the given conditions with the highest efficiency and the automatic regulator has to maintain constant this value of the power-factor, insuring the working of the plant throughout the whole range of load with the highest efficiency.

As I have stated, the terminal pressure of the induction motor can be regulated in accordance with the load or with the power-factor in order to reach the maximum value of the efficiency corresponding to the load.

The impressed E. M. F. of the induction motor may be regulated according to my invention as well if the current feeding the motor is supplied directly by a primary generator or by a secondary generator for example transformer or rotary converter for example a phase converter.

Figure 2:
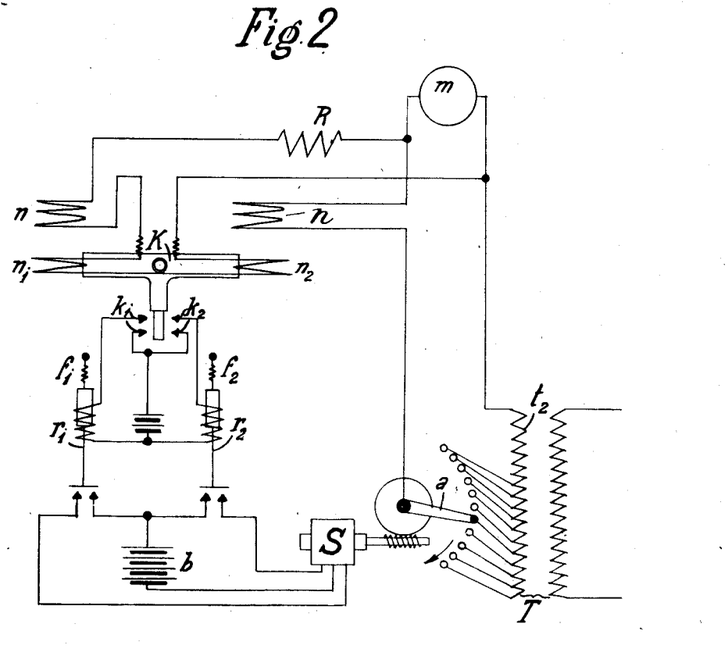
Fig. 2 is a diagrammatic view of apparatus for regulating the pressure of an induction motor in response to changes in load.

Referring to Fig. 2, the current for the induction motor $m$ to be regulated is supplied by the secondary winding $t_2$ of a transformer T, and the E. M. F. impressed to the motor is regulated by switching in more or less windings of the secondary coils $t_2$ by means of the controlling arm $a$. This latter is driven by a servomotor $s$ fed by a current source $b$.

The servomotor $s$ is running in one or the other direction according to whether the electromagnetic switch $r_1$ or $r_2$ is completing the circuit of the current source $b$ through the servomotor $s$. The electromagnetic switches $r_1$ and $r_2$ are controlled by a regulator K shown in the drawing for the purpose of illustration as an electrodynamic balance actuating alternatively the contacts $k_1$ and $k_2$. The balance carries on its both ends the shunt coils $n_1$ and $n_2$ respectively, the one cooperating with a stationary shunt coil $n$ and the other with the stationary main current coil $h$. R is an ohmic resistance in the shunt circuit insuring the desired high resistance of the latter.

The relative action of the two shunt coils $n$, $n_1$ on the one end of the balance is directly proportional to the square of the E. M. F. "$e$", whilst the attractive power exerted upon the other end of the balance by the relative action of the main current coil $h$ and shunt coil $n_2$ is directly proportional to the load.

Since the regulation ought to be effected according to $\frac{W}{e^2} = C$ (C being a constant) viz: $W = Ce^2$, it can be attained by suitable dimensioning of the coils of the balance, so that the action of the coils $n$, $n_1$ upon the one arm balances the action of the coils $h$, $n_2$ upon the other arm if $W = C.e^2$. In this equilibrium both the contacts $k_1$ and $k_2$ are open.

If the load increases, the attraction of the coils $h$, $n_2$ prevails and the circuit will be closed at the contact $k_2$ through the solenoid of the switch $r_2$. This latter closes its contact against the counter force of the spring $f_2$ and excites the servomotor $s$ in the sense, that the controlling arm $a$ moves in the direction of the arrow and by switching in further windings of the secondary $t_2$ of the transformer T increases the E. M. F. impressed to the motor $m$ until the ratio $W = C.e^2$ is restored, when the balance regains its equilibrium state.

More motors than one can be fed simultaneously from the same current source only if the load conditions of the motors change simultaneously and similarly as it is the case with mechanically coupled motors of an electric locomotive. If several independent motors or motor groups are to be fed from the same line, each independent motor or motor group must be provided with its own transformer or converter for example a phase converter with regulated exciting circuit as will be described later on, the primaries of said transformers being connected to the common line, whilst their secondaries supply the current to the induction motors to be regulated according to my invention. In such a system the pressure and the current vary only within the secondary circuits of the transformers or converters, whilst the voltage of the line feeding the primaries of all the transformers or converters may be kept constant.

Figure 3:
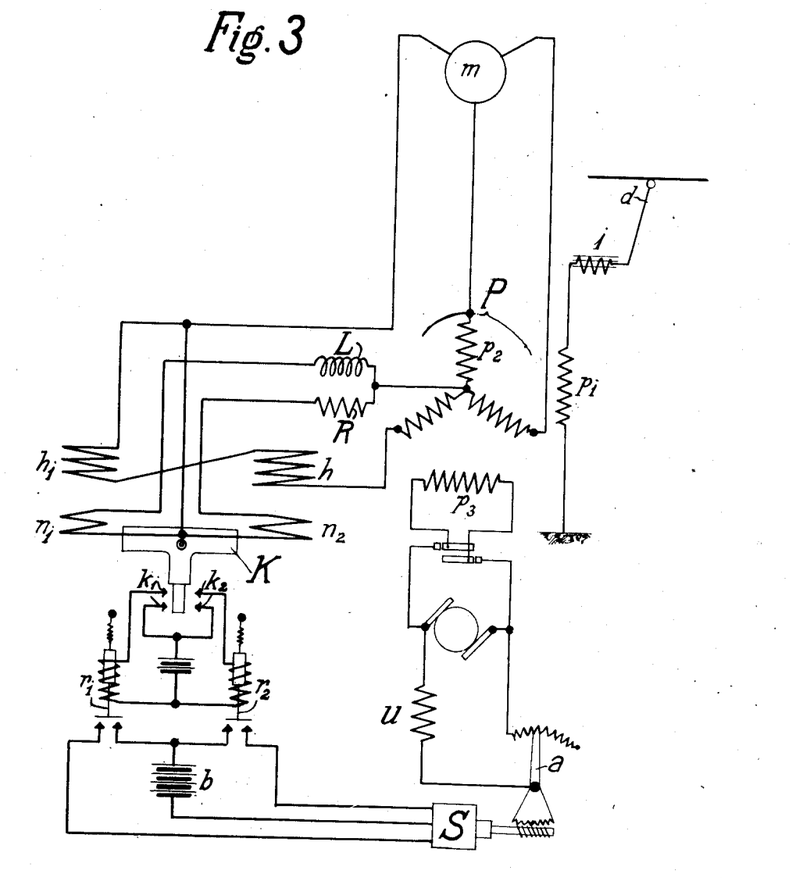
Fig. 3 is a diagrammatic view of apparatus for regulating the pressure of an induction motor by maintaining the power factor at a constant value.

The apparatus shown in Fig. 3 is designed for the regulation of pressure according to a constant value of the power factor and differs from that one shown in Fig. 2 by the three phase-motor $m$ being fed by a synchronous phase converter P having a low-voltage three-phase secondary $p_2$ and a high voltage single-phase primary $p_1$, this latter being connected in the case of railway motors to the trolley $d$ and to the track return respectively. The phase converter is provided with a rotating field magnet $p_3$ energized by the direct current of the exciter U.

The secondary E. M. F. of the phase converter is regulated by the rheostat $a$ provided in the field circuit and controlled by the servomotor $s$.

Since the regulation is effected in response to the power-factor, both shunt coils $n_1$, $n_2$ of the balance K cooperate with main current coils $h_1$ and $h$ respectively and the phase of the current flowing through the shunt coil $n_1$ is shifted 90° in respect to the current flowing through the shunt coil $n_2$. For this purpose for example the circuit of the coil $n^2$ has a pure ohmic resistance R, whilst the circuit of the other coil $n_1$ receives a choke coil L with a very low ohmic resistance. Hence the coils $h$, $n_1$ will exert an attractive power directly proportional with the watt-component of the current, and the coils $h_1$ $n_1$ an attractive power directly proportional to the wattless component of the current, the forces acting upon both ends of the balance K being in equilibrium only if the ratio of the watt- and wattless component will have a definite value fixed by the dimensions of the electrodynamic balance, so that this latter will regulate to maintain the power factor at a definite constant value.

It may be understood, that the regulator K is shown in Figures 2 and 3 only for the sake of illustration as an electrodynamic balance and any other suitable device responding to the changes (and to the sense of such changes) of the ratio of W and $e^2$ or of the power factor respectively may be used instead.

If the regulation is effected by varying the excitation of a rotary phase-converter of the synchronous type, as shown in Fig. 3, any change of the secondary voltage in $p_2$ will react upon the primary voltage in $p_1$. If the voltage varies within a wide range, the self-induction of the primary circuit of the phase converter must be sufficiently high to balance the changes of voltage caused by the regulation. For this purpose Fig. 3 shows a self-induction $l$ between the trolley and the single-phase primary $p_1$ of the phase converter.

By using a separate self-induction coil, the whole coil must be insulated for the high primary voltage. If however the primary $p_1$ of the converter itself had the desired high self-induction, it would be sufficient merely to provide the coils in proximity of the trolley $d$ with an insulation sufficient for the total high voltage, whilst the insulation could gradually diminish towards the grounded end of the primary $p_1$.

My invention provides means allowing to reach a very high self-induction of the single-phase primary of the phase-converter without a substantial increase of weight.

For this purpose I do not arrange as usual the single-phase winding of the phase converter in close proximity to, and in the same slots with the three-phase windings in the active iron, but I divide the two windings by magnetic shunts, partly short-circuiting the magnetic flux.

Figure 4:
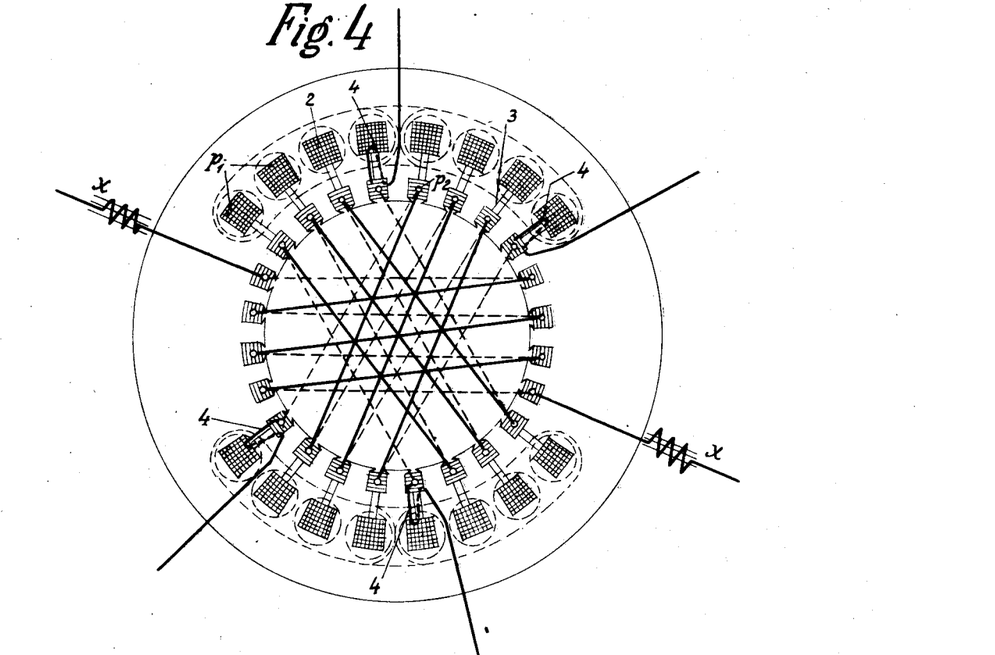
Figs. 4 and 5 respectively diagrammatically show modifications of the slots receiving the primary and secondary windings of a rotary converter feeding a three phase motor from a single phase line.
Figure 5:
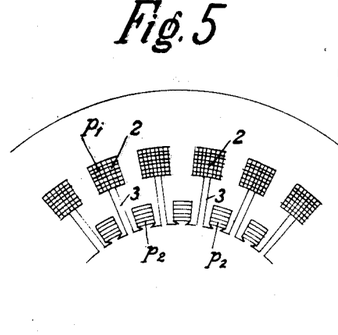

Figs. 4 and 5 show two different slot arrangements according to my invention.

The three-phase windings $p_2$ are seated in the inner slot circle of the active iron, whilst for the primary winding $p_1$ separate slots 2 are provided located on a larger radius, than the slots containing the secondary windings $p_2$ and separated from these latter by magnetic shunts formed by a restriction 3 of the slots. Part of the magnetic flux will be closed through these magnetic shunts 3 between the inner and outer slot circle, as shown by the dash and dot lines of Fig. 4.

The alternative modification Fig. 5 shows the slots for the single-phase primary $p_1$ located between two slots of the three-phase secondary $p_2$ so that the restricted part 3 of the slots 2 extends between two adjacent slots of the secondary $p_2$ up to the air-gap of the converter.

By locating the single-phase and three-phase windings in separate slots, the uneven voltage-drop in the different phases of the three-phase winding caused by the mutual induction of the single-phase and three-phase windings can be compensated.

In the air-gap 3 (Figs. 4 and 5) of the magnetic shunt of the single phase winding a magnetic flux being in phase with the single-phase current is generated. In a coil 4 (Fig. 4) induced by this magnetic flux an E. M. F. will be generated which is shifted with 90° in respect to the single-phase current, and is in phase with the E. M. F. generated in the three-phase winding by the mutual induction of the single-phase and three-phase windings. With a suitable number of turns of the coil 4 the E. M. F. induced in this latter will be not only of the right phase, but also of the right value to compensate, if connected in the proper sense in series with the three-phase-windings, precisely the effect of the mutual induction of the single-phase and three-phase windings.

The self-induction generates to an E. M. F. in the coils 4 being shifted with 90° in respect to the three-phase current. As only the two phases of the three-phase winding submitted to the direct influence of the single-phase winding are provided with coils 4, for sake of compensation of the effect of the selfinduction of the coils 4 upon the respectiv two phases, an equal self-induction $x$ will be inserted into the circuit of the third phase (Fig. 4). Thus in spite of the unevenness of the induction exerted by the single-phase winding upon the three phases of the three-phase winding, the terminal E. M. F. will be equal within the whole range of load in all the three phases.

Since part of the magnetic flux is shunted having no effect upon the current conversion (Figs. 4 and 5), the self-induction of the primary circuit may be considerably increased, without substantial increase of the weight of the converter. By putting the high self-induction into the primary winding of the converter, it is possible to insulate only the coils adjacent to the trolley for the full voltage, whilst the insulation decreases successively towards the grounded end of the winding. The possibility of increasing the self-induction without constructive drawbacks ad libitum, allows to maintain at its maximum value not only the efficiency of the motor but also the efficiency of the phase-converter.

By giving to the primary winding of the phase-converter a definite high self-induction and by regulating the impressed E. M. F. of the motor in the above specified manner according to a substantially constant value of $\dfrac{W}{e^2}$ or of the power-factor of the secondary circuit of the converter it is possible to ensure, as will be shown with reference to Fig. 6, that the phase-displacement in the primary circuit of the phase-converter will be at all loads within a wide range very small and the power factor of the converter will approximatively reach unity. From this arises the advantage, that within a wide range of the load not only the motor $m$ or the aggregate consisting of motor $m$ and converter P works with the highest efficiency but also the converter with the best (approximatively unity) power factor in its primary circuit.

Figure 6:
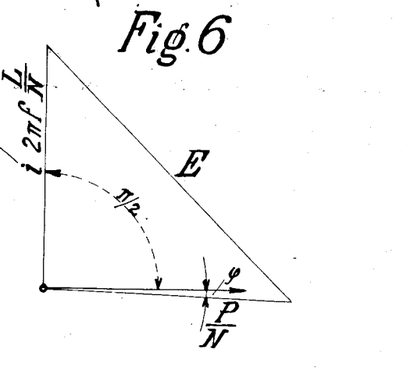
Fig. 6 is a vector diagram of the rotary converter.

Referring to Fig. 6, E is the E. M. F. induced in one conductor of the three-phase winding of the phase-converter; P is the terminal pressure of the single-phase primary winding and $$\dfrac{i \cdot 2\pi f \cdot L}{N}$$

the E. M. F. generated by the self-induction by a current $i$ at a frequency $f$ in one turn of the primary winding of N turns. The current $i$ flowing through the primary winding leads with respect to the E. M. F. of the self-induction with 90°. The phase of the current $i$ is shifted with an angle $\delta$ with respect to the E. M. F. "P" of the single-phase winding; hence the whole input of energy (W) of the converter is $$W = P \cdot i \cdot \cos \delta$$

If the secondary E. M. F. "E" is regulated to keep $\dfrac{W}{e^2}$ constant we can reach by an appropriate value of the self-induction L, that at changes of the load W within a wide range, the phase displacement $\delta$ caused by the phase-converter in the primary circuit will be very small and the power-factor of the primary circuit of the phase-converter will approximatively attain the unity.

If at full load in the secondary circuit E is for example 7 volts and P is between 3 and 4 volts, whilst the E. M. F. of the self-induction $$\frac{i \cdot 2\pi f \cdot L}{N} = 6.17 \text{ V}$$

the following values of the E. M. F. "E" and of the power factor in the primary circuit of the converter correspond to each other if the impressed E. M. F. of the motor is regulated according to $\frac{W}{e^2}$ = Const.

(d)  4/4 load  E=7V  cos δ=1
     3/4   "   E=6,06V  cos δ=0.991
     2/4   "   E=4,95V  cos δ=0.987
     1/4   "   E=3,5V  cos δ=0.987

It is to be seen that the greatest deviation of the value of the power factor from the unity is 1.3%.

Owing to the fact, that if the impressed E. M. F. of the motor is regulated according to $\frac{W}{e^2}$ = Const, the power factor in the primary circuit of the converter will remain under the above conditions approximatively at the unity value, the regulation of the impressed E. M. F. of the motor may be effectuated in response to the changes of the power factor in the primary circuit viz. according to a constant value of the power factor in the primary circuit, by which under equal conditions the E. M. F. in the secondary circuit will change to comply approximatively with the formula $\frac{W}{e^2}$ = Const, hence the condition of good efficiency of the motor within the range of load to be considered is fulfilled.

If the regulation is performed in a way that the phase displacement in the primary circuit is kept throughout exactly zero or the power factor at unity value, the ratio $\frac{W}{e^2}$ corresponding to different loads will slightly differ from the constant value as is to be seen from the following data:

The regulation performed to suppress any phase-displacement in the primary circuit within the whole range of load under the same conditions as attained under formula (d) the secondary voltage E will attain the following values:

(e)     at 4/4 load  E=7 V
        "  3/4   "   E=5.7 V
        "  2/4   "   E=4.57 V
        "  1/4   "   E=3.73 V Comparing the voltages given under (e) with the values of the voltage E indicated under (d) necessary to maintain a constant value of the ratio $\frac{W}{e^2}$, there results a difference of the voltage:

at 4/4 load  0%   of the voltage E
 " 3/4   "  −6%    "    "    "   "
 " 2/4   "  −7.7%  "    "    "   "
 " 1/4   "   6.5%  "    "    "   "

It will be seen, that the maximum difference is less than 8% of the voltage E, hence so small, that considering the fact, that the curve of the efficiency runs very flat in the vicinity of the maximum efficiency (which ought to be maintained according to my invention), the slight differences of the voltage E represented as abscissa e of the efficiency curve cause no sensible change of the ordinates representing the efficiencies.

If the converter supplies the current for two or more motors running alternately in cascade or parallel connection, the definite value of the ratio $\frac{W}{e^2}$ corresponding to the highest efficiency is larger at the parallel running of the motors, than at the cascade running. In such a case it will be useful to connect in series with the primary of the converter a selfinduction-coil allowing to change the selfinduction of the primary circuit by shortcircuiting said selfinduction coil when the motors work in parallel. The same will be necessary if the speed regulation of the motors is effected by changing the pole connections.

Figure 7:
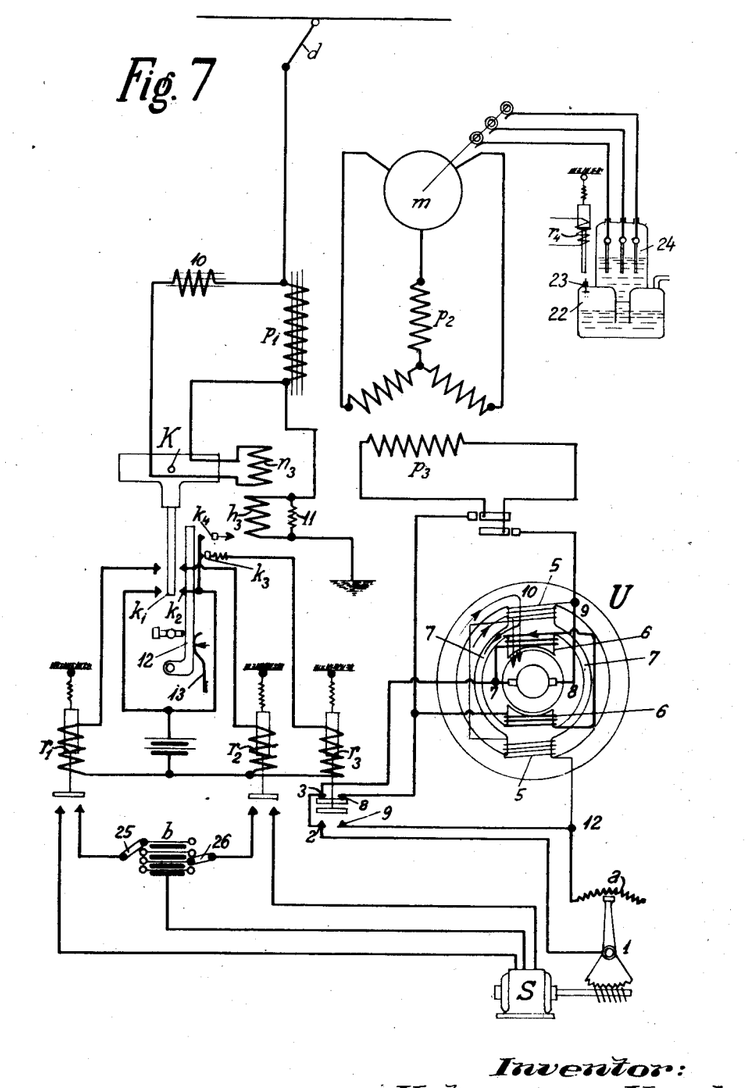
Fig. 7 is a diagrammatic view of apparatus for maintaining the power factor at unity value in the primary circuit of a rotary converter.

Fig. 7 shows apparatus designed to maintain the power factor in the primary circuit of the phase converter at the unity value. It is substantially similar to the arrangement shown in Fig. 3 with the difference that the high selfinduction C of Fig. 3 is incorporated into the primary winding $p_1$ in the manner described with reference to Figs. 4 and 5 and that the electrodynamic balance K is acted upon by only one movable and one stationary coil $n_3$ and $h_3$ respectively, the coil $n_3$ being connected in shunt and the coil $h_3$ in series with the primary winding $p_1$ of the converter. The selfinduction coil 10 connected in series with the shunt coil $n_3$ having a high self-induction and a small ohmic resistance, causes the current flowing through this coil to lag nearly with 90° with respect to the terminal voltage.

If the primary current of the converter flowing through $p_1$ is in phase with the terminal voltage, the coils $h_3$, $n_3$ do not exert any mutual dynamic effect and the balance K keeps its intermediate position. As soon however as the current lags or leads, the mutual attraction or repulsion of the coils $h_3$, $n_3$ causes the balance K to close the contacts $k_1$ or $k_2$ respectively and energizes the electromagnetic switches $r_1$ or $r_2$ causing the servomotor $s$ to revolve in the one or other direction and to shift the rheostat $a$ of the exciter U in a sense to increase the excitation at a lagging current and to diminish the excitation at a leading current to an extent to compensate the phase displacement in the primary circuit of the converter.

As even a high self-induction of the one coil $(n_3)$ cannot shift the phase with total 90° with respect to the main current, it is advisable to give to the current flowing through the coil $h_3$ a constant lead of phase with respect to the main current for example by providing a shunt 11 for the coil $h_3$ having a different inductance or resistance than this latter coil. Hence in spite of the current flowing through the coil $n_3$ being shifted with an angle differing from 90° with respect to the terminal-voltage there may be attained a phase-displacement of exactly 90° of said current with respect to the current flowing through the coil $h_3$. Most preferably a shunt with a larger time-constant $\frac{L}{R}$ as the coil $h_3$ will be used, in which case the phase lagging caused by the coil $n_3$ may be less than 90°.

The high selfinduction of the input side of the phase-converter required to render possible the voltage-regulation of the desired range has the drawback, that the converter has at lower voltages only a very restricted overload capacity. This drawback is however in the present case of no importance, provided the voltage is increased rapidly enough according to the increase of load. If however the load raises so suddenly, that the voltage-regulation cannot follow it, the sudden overload of the phase-converter throws this latter out of synchronism or out of phase. This danger is more imminent if the voltage regulation is performed by changing the excitation of the converter and especially by controlling the field of the exciter of the converter, because the exciting circuit possesses a relatively considerable time constant, whilst this very method of regulation is practically the most preferable.

The effect of the time constant of the excitation could be diminished by inserting normally a resistance in the exciting circuit and short circuiting said resistance if the load rises too rapidly, but this method would cause a relatively considerable loss of efficiency.

According to my invention I provide the exciter besides the shunt field-winding with a series field-winding acting in the same sense and the pole cores of the exciter between the shunt- and the series field-winding with a magnetic shunt and provide further an overload relay inserting the series-winding of the exciter only at a definite overload and only until the overload has been compensated by the voltage-regulation.

Referring to Fig. 7, U is the exciter 5 the shunt-field-winding and 6 the series field-winding of the same. 7 is the magnetic shunt located between said shunt and series windings.

The series winding 6 is normally short circuited by the overload relay $r_3$. No current flows then through the series field-winding 6 and the exciter is magnetized only by the shunt winding 5, part of the flux generated flowing through the magnetic shunt 7 as indicated by the arrows drawn in full lines.

Means are provided to allow the relay $r_3$ to operate only at an overload not compensated in due time by the voltage regulation shown in Figs. 3 or 7. For this purpose the relay $r_3$ may be constructively united with the relay $r_2$ shown in Figs. 2 or 7 to form a two-step relay the first step acting for the relay $r_2$, whilst the second step coming in action only after the circuit of the winding $r_3$ has been closed for example by a contact $k_3$ provided on the lever 12 bearing the contact $k_2$ for the relay $r_2$. A spring 13 bearing against the lever 12 keeps contact $k_3$ open; the action of said spring 13 will be overcome if the critical overload is reached and the lever 12 shifted thereby closing contact 13 for the relay $r_3$.

The relay $r_3$ being energized breaks the contact 8 short circuiting the series winding 6. The current flowing through the winding 6 tends to strengthen the action of the shunt winding 5, as shown by the dotted arrows indicating the flux generated by the series winding 6. As the flux generated in the magnetic shunt 7 by the series windings counteracts and overweights the flux generated in said magnetic shunt by the shunt field winding 5, the flux in the magnetic shunt 7 will be reversed. Thus the strength of the magnetic field of the exciter raises without any lag, the time-constant of the shunt winding 5 causing no retardation, as the increase of the flux is effectuated through the magnetic shunt 7, avoiding the shunt field winding.

The cores and the shunt 7 of the magnetic field will be preferably laminated so that eddy currents may not retardate the quick reversal of the magnetization of the bridge 7.

It may be further advisable, to operate by the relay $r_3$ a second switch 9 short circuiting the rheostat $a$ of the shunt field-winding 5 at the putting in circuit of the series field-winding 6 at the contacts 8, 8.

The above described means decrease the effect of the time-constant of the voltage-regulation if this latter cannot follow the rapid increase of the load. However the load may increase so rapidly in a high degree, that even the action of the series field-winding 6 of the exciter may not be able to effect the compensation in right time. I provide therefore means successively switching in circuit the starting resistance of the induction motor to be regulated, if the sudden load-increase is of the above indicated nature not to be overcome by the action of the series-field winding of the exciter.

In Fig. 7 a liquid rheostat actuated by compressed air is shown for starting the motor $m$. 22 is the compressed air chamber into which compressed air is applied when starting the motor, thereby pressing the electrolyte into the rheostat chamber 24. 23 is a pressure valve in the compressed air chamber 22 and $r_4$ a relay controlling the air valve 23. Normally the relay $r_4$ is deenergized and valve 23 closed.

$K_4$ is a stationary contact cooperating with the contact arm 12 to close the circuit for the air valve-relay $r_4$. Contact $k_3$ is resilient.

If the load increases so suddenly and in such a degree, that the action of relay $r_3$ is insufficient for compensation, the spring bearing against contact $k_3$ will be compressed and contact $k_4$ closed, whereby the air-valve-relay $r_4$ will be energized and the valve 23 opened. The compressed air escaping from the air chamber 22 will allow the electrolyte to sink in the rheostat chamber 24 and increase the resistance sufficiently.

It may be desirable to run the servomotor $s$ of the rheostat $a$ with different speeds in the two directions. I provide therefore for example the cell-switches 25 and 26 allowing to regulate the voltage feeding the motor at its running forwards independently from the speed at its running backwards.

At the regulation according to the unity power factor in the primary circuit of the phase converter, as shown in Fig. 7, the coils $n_3$, $h_3$ of the electrodynamic balance K ought to be influenced from the input or high-voltage side of the converter. There is no inconvenience for the series coil $h_3$, as it may be simply connected in series at the low-voltage end of the primary winding $p_1$ of the converter, possessing a high inductive resistance, but for the shunt coil $n_3$ the high primary voltage of the line conduct ought to be used; as the current flowing through the coils $n_3$ and $h_3$ must have a considerable phase displacement, the necessary self-induction of the coil $n_3$ would require at the high voltages for example 10.000–15.000 V in consideration excessive dimensions for the shunt coil $n_3$ or for the self-induction coil 10 connected in series therewith. To avoid this, the coil $n_3$ should be fed by the intermediate of a transformer. According to my invention the use of separate transformers can be avoided and the magnetic field generated in the active iron of the converter by its primary winding may be utilized. I provide in this field low-voltage coils termed for the sake of convenience "controlling coils" the magnetic axis of which coincides with the magnetic axis of the primary winding of the converter. If however the regulating balance K is influenced according to the wattless component, the magnetic axis of the controlling coils stands at an appropriate small angle to the magnetic axis of the primary of the converter in order to compensate the ohmic resistance of the controlling coils and of the circuit fed by them. The current induced in the controlling coils supplies the current for the shunt coils of the regulating balance K.

Although I have described for purposes of illustration several embodiments of my invention it is to be understood that I am not limited thereby to their particular details, but that within the scope of my invention wide deviations may be made therefrom without departing from the spirit of my invention.

What I claim is:

1. The method of regulating alternating current induction motors which consists in varying the impressed electromotive force with the varying load in response to a change in the load conditions substantially in direct proportion to the square root of the load.

2. The combination with an alternating current induction motor, of a primary source of electromotive force, means for converting the primary electromotive force into a secondary electromotive force, means for impressing said secondary electromotive force on the terminals of said motor, and automatic means for varying said secondary electromotive force in response to changes of the load conditions of said motor substantially in direct proportion to the square root of the load on said motor.

3. The combination with an alternating current induction motor, of a primary source of electromotive force, means for converting the primary electromotive force into a secondary electromotive force, means for impressing said secondary electromotive force on the terminals of said motor, and automatic means for regulating said means for converting said primary electromotive force into said secondary electromotive force in response to changes in load conditions of said motor to cause said secondary electromotive force to vary substantially in direct proportion to the square root of the load on said motor.

4. The combination with an alternating current induction motor, of a primary source of electromotive force, means for converting the primary electromotive force into a secondary electromotive force, means for impressing said secondary electromotive force on the terminals of said motor, and automatic regulating means for said means for converting said primary electromotive force into said secondary electromotive force, said regulating means being responsive to the current factor of the load conditions of said motor in substantially direct proportion thereto and to said secondary electromotive force substantially in inverse proportion to the square of said secondary electromotive force.

5. The combination with an alternating current induction motor, of a primary source of electromotive force, means for converting the primary electromotive force into a secondary electromotive force, means for impressing said secondary electromotive force on the terminals of said motor, and automatic means responsive to the current and pressure conditions impressed on the terminals of said motor for varying said secondary electromotive force substantially in direct proportion to the square root of the load on said motor.

6. The combination with an alternating current induction motor, of a primary source of electromotive force, means for converting the primary electromotive force into a secondary electromotive force, means for impressing said secondary electromotive force on the terminals of said motor, and automatic means responsive to the watt-component and the wattless-component of the current impressed on the terminals of said motor for varying said secondary electromotive force in substantially direct proportion to the square root of the load.

7. The combination with a polyphase induction motor of a single phase source of electromotive force, of means for converting electromotive force from said source into a polyphase secondary electromotive force at variable potentials, means for impressing said secondary electromotive force on the terminals of said motor, and automatic means for regulating said first named means in response to changes in electrical conditions determining the load on said motor for varying said secondary electromotive force substantially in direct proportion to the square root of the load on said motor.

8. The combination with a polyphase induction motor of a single phase source of electromotive force, a synchronous phase converter for converting said single phase electromotive force into a polyphase electromotive force, and automatic means for regulating said phase converter in response to changes in the load on said motor for causing the potential of said polyphase electromotive force to vary in direct proportion to the square root of the load.

9. The combination with a three phase induction motor of a high voltage single phase source of electromotive force, a rotary phase converter for converting said single phase electromotive force into a low voltage three phase electromotive force, a direct current exciter for said converter, and automatic means responsive to load conditions of said motor for varying the exciter current to cause the potential of said three phase electromotive force to vary in substantially direct proportion to the square root of the load on said motor.

10. The combination with a three-phase induction motor of a single phase primary source of electromotive force, a converter having a three phase secondary winding for converting said single phase electromotive force into three phase electromotive force, means for impressing said three phase electromotive force on the terminals of said motor, and automatic means for regulating said converter in response to load conditions of said motor for varying the potential of said three phase electromotive force in substantially direct proportion to the square root of the load on said motor.

11. The combination with a three phase induction motor, of a high voltage single phase source of electromotive force, a rotory synchronous phase converter, said phase converter having an active iron body, a high voltage primary winding and a low voltage three phase secondary winding on said iron body, said primary winding having impressed thereon said high voltage source of electromotive force and the electromotive force of said secondary winding being impressed on the terminals of said motor, a revolving direct current field winding for said converter, and automatic means responsive to the load conditions of said motor for varying the exciter current for causing the potential impressed on the terminals of said motor to vary substantially directly as the square root of the load on said motor.

12. The combination with a three phase induction motor, of a high voltage single phase source of electromotive force, a rotary synchronous phase converter, said phase converter having an active iron body, a high voltage primary winding and a low voltage three phase secondary winding on said iron body, said primary winding having impressed thereon said high voltage source of electromotive force and the electromotive force of said secondary winding being impressed on the terminals of said motor, a revolving direct current field winding for said converter, an exciter generator for said field winding, and automatic means responsive to the load conditions of said motor for regulating said exciter generator, said means varying the exciter current to cause the electromotive force impressed on the terminals of said motor to vary substantially directly as the square root of the load on said motor.

13. The combination with a three phase induction motor, of a high voltage single phase source of electromotive force, a rotary synchronous phase converter, said phase converter having an active iron body, a high voltage primary winding and a low voltage three phase secondary winding in said iron body, said windings being disposed at different radial distances in said iron body, said iron body being formed to provide magnetic shunts between the coils of said primary and secondary windings, said primary winding having impressed thereon said high voltage source of electromotive force and the electromotive force of said secondary winding being impressed on the terminals of said motor, said converter having a direct current field winding revolving in the field of said primary and secondary windings, and automatic means responsive to the load conditions of said motor for varying the exciter current for causing the potential impressed on the terminals of said motor to vary substantially directly as the square root of the load on said motor.

14. The combination with a three phase induction motor, of a converter having a single phase primary winding with high self induction and a three phase secondary winding, a high potential line the electromotive force of which is impressed on said primary winding, the electromotive force of said secondary winding being impressed on the terminals of said motor, and means for automatically regulating said converter in response to changes in load conditions of said motor for causing said electromotive force of said secondary winding to vary substantially directly as the square root of the load on said motor.

15. The combination with a three phase induction motor, of a converter having a single phase primary winding with high self induction and a three phase secondary winding, a high potential line the electromotive force of which is impressed on said primary winding, the electromotive force of said secondary winding being impressed on the terminals of said motor, said converter having a rotating direct current exciter winding, regulating means for varying the exciter current in said exciter winding, and controlling means for said regulating means automatically responsive to load conditions of said motor for causing the variations in exciter current to maintain the electromotive force impressed on the terminals of said motor to be substantially in direct proportion to the square root of the load on said motor.

16. The combination with an induction motor of a primary source of electromotive force, converter means for converting the primary electromotive into a secondary electromotive force, said secondary electromotive force being impressed on the terminals of said motor, regulating means for said converter means, a servo-motor for actuating said regulating means, means for actuating said servo-motor in response to changes in the load conditions of said motor for causing said secondary electromotive force to vary in substantially direct proportion to the square root of the load on said motor.

17. The combination with an alternating current induction motor, of a source of electromotive force, means for impressing said electromotive force on the terminals of said motor, and automatic means responsive to changes in load conditions for varying said electromotive force in such proportion to the load as to secure for each load throughout the range of load a maximum efficiency.

18. The combination with an alternating current induction motor, of a source of electromotive force, means for impressing said electromotive force on the terminals of said motor, and automatic means responsive to changes in load conditions for varying said electromotive force to maintain a constant power factor corresponding to the maximum efficiency.

19. The method of regulating alternating current induction motors which consists in varying the impressed electromotive force in response to changes in load conditions to maintain a constant power factor less than the maximum and corresponding to maximum efficiency.

In testimony whereof I affix my signature in presence of two witnesses.

KALMAN v. KANDO.

Witnesses:
S. B. VAUGHAN,
EUG. HARSAUR.